United States Patent [19]

Holzem

[11] Patent Number: 5,106,265
[45] Date of Patent: Apr. 21, 1992

[54] WIND-TURBINE WING WITH A PNEUMATICALLY ACTUATED SPOILER

[76] Inventor: Astrid Holzem, An den Hüren 51, 4050 Mönchengladbach 1, Fed. Rep. of Germany

[21] Appl. No.: 514,096

[22] Filed: Apr. 25, 1990

[30] Foreign Application Priority Data

Apr. 25, 1989 [DE] Fed. Rep. of Germany ....... 3913505

[51] Int. Cl.⁵ .............................................. F03D 11/00
[52] U.S. Cl. .................................. 416/23; 416/90 R
[58] Field of Search .................... 416/23, 24, 32, 90 R, 416/91, 169 R, 169 B, 236 R, 240, DIG. 7, 31, 43, 44, 45, 95, 232, 233, 92

[56] References Cited

U.S. PATENT DOCUMENTS

| | | | |
|---|---|---|---|
| 2,170,911 | 8/1939 | Raulerson | 416/95 |
| 2,321,668 | 6/1943 | Gentry | 416/45 |
| 2,485,543 | 10/1949 | Andreau | 416/23 |
| 2,918,978 | 12/1959 | Fanti | 416/23 |
| 4,247,253 | 1/1981 | Seki et al. | 416/23 |

FOREIGN PATENT DOCUMENTS

| | | | |
|---|---|---|---|
| 0283730 | 9/1980 | European Pat. Off. | |
| 2844262 | 4/1980 | Fed. Rep. of Germany | |
| 2429147 | 2/1980 | France | 416/233 |
| 2432626 | 4/1980 | France | 416/31 |
| 39656 | 12/1936 | Netherlands | 416/91 |
| 547546 | 5/1977 | U.S.S.R. | 416/90 R |
| 244385 | 12/1925 | United Kingdom | 416/91 |

*Primary Examiner*—Edward K. Look
*Assistant Examiner*—James A. Larson
*Attorney, Agent, or Firm*—Toren, McGeady & Associates

[57] ABSTRACT

A flexible spoiler is arranged on the suction side of a wing and spoiler is made of a narrow flexible fold tape covering a tunnel which is sealed against the outer airstream and extends inside the wing from the root to the tip thereof. When the fold tape is deployed from a conform position it forms a trip producing stall. Deploying and conforming are achieved by varying the tunnel pressure. The pressure is essentially generated and varied by the tunnel aircolumn under centrifugal acceleration and throttled by an inlet throttle near the wing root and an outlet throttle near the wing tip. Opening the inner throttle increases the tunnel pressure to deploy the fold tape in the case of maximum speed and/or shaft torque of the wind-turbine.

8 Claims, 2 Drawing Sheets

WIND-TURBINE WING WITH A PNEUMATICALLY ACTUATED SPOILER

BACKGROUND OF THE INVENTION:

This invention relates to a wind-turbine having a hub carrying a wing which is fitted with a controllable spoiler on its suction side.

The spoiler is immediately actuated by air pressure to initiate a stall in the case of maximum speed and/or shaft torque of the wind-turbine.

The European Patent Application No. 0283730 describes an inflatable and stretchable diaphragm to vary the profile contour along the entire chord length, hence influencing the lift of an air foil or a hydrofoil. In principle this type of diaphragm could locally form a sharp edge trip required to initiate a stall if the diaphragm would be much shorter than the chord length. The disadvantage would be a required high air pressure and an overstretched diaphragm. In addition, by retracting the sharp edge the diaphragm creeps back contacting the wing contour, thus producing friction and wear.

It is further known from the German disclosure DE-OS 28 44 262 to actuate immediately a spring biased flap type spoiler by ram air force from outside of the wing. The flap is mounted inside the wing tip. The enduring ram air has the disadvantage of plugging the flap chamber with dirt particles. In addition, the ramming produces a high drag. By these means so far, only the overspeed may be roughly reduced but not a possible overtorque.

SUMMARY OF THE INVENTION:

The object of the present invention is to obviate the aforementioned disadvantages. According to the invention, a pneumatically actuated spoiler is provided, being of a simple design and providing a high degree of reliability and efficiency. Furthermore, adequate means are provided for the steady control of speed and/or torque to save the gearbox and the alternator.

A main aspect of the present invention is a flexible spoiler arranged on the suction side of the wing. The spoiler covers preferably a radial outer part of a tunnel. The long leading and trailing edges and the short edges of the spoiler are seal fixed at the wing surface so that the tunnel is essentially sealed against the environment. Inside the wing, the tunnel extends from the wing root to the wing tip. When the spoiler is deployed, it forms a trip to produce stall on the suction side. Deployment is achieved by increasing the tunnel pressure which is generated and varied by the tunnel air column under centrifugal acceleration, by an inlet throttle to the tunnel at the root, by the inlet pressure to the inlet throttle, by an inlet throttle and a low essentially constant pressure source, i.e., a venturi at the wing tip. The inlet pressure is also essentially constant and may be ambient or may be generated by an alternator cooling fan.

Inside the tunnel, the centrifugal acceleration, hence, the static pressure, increases with the growing radius of rotation. When the outlet throttle is fully closed and the inlet throttle is already a bit opened, the local tunnel pressure is equal to the respective outer local ram pressure. In this case, the spoiler is fully deployed from the wing, conforming to the trip position. Vice versa, a more closed inlet throttle and at least a more opened outlet throttle lowers the tunnel pressure and retracts the spoiler towards the wing conform position. By these means, ram air from outside of the wing is avoided. By using the higher centrifugal tunnel pressure, optionally boosted by a fan, and the lower venturi pressure, there is sufficient push-pull force to deploy and retract, thus avoiding an additional spring biasing of the spoiler.

More detailed subitems or examples within the invention refer to different spoilers. The spoiler may be a narrow folded tape having at least one folded aligned in the radial direction of the wing. The folds allow the required bending without stretching or friction. In consequence, a very low material stress and a high number of load cycles is possible. The folds are on the tunnel side. Therefore, they do not need additional cross-sectional area at the wind. In the normal conform position they also do not disturb the suction side streamlines. Due to the sealed leak-reduced cover at the tunnel, there is only a low airflow rate and hence a small tunnel cross-sectional area and a small venturi required. The low airflow rate also allows efficient preheating and filtering. Under those circumstances a large radial length of more than e.g. 30% of the wing, especially close to the wing tip, may be equipped with such type of maintenance free and continuous aerodynamic spoiler brake.

Stops and ledges have to be provided to limit the degree of deployment in order to provide a constant and relative small trip elevation, which is preferably required. Contour shaped pillars provide conform contour of a high performance wing profile. Fortunately, the constant trip elevational produces a defined brake force relative to the deployed length at a given angle of attack of the relative wind. Thus, the deployment length is fairly proportional to the wings aerodynamic braking torque which is an essential condition for a stable and smooth speed and torque control loop.

The fold tape may have one or more folds; for instance, it may have a fold at its leading edge and another fold at its trailing edge. The trip is limited by stops opposed to each fold inside of the tunnel. Another fold tape may have one or more folds near its centerline. Ledges limiting the trip are fitted to the summit of the folds and to the pillars inside the tunnel. In order to be easily movable up and down, the fold tape short edges are each opposed via narrow gaps close to end plates fitted on the wing to avoid friction respective to reduce leakage flow. As an alternative, the short edges may be sealingly fixed, similar to the leading and trailing edges. The required up and down mobility of the fold tape then quickly increases with the distance from the edges due to the high degree of flexibility. With respect to high performances laminar wing profiles, the conform contour deviations should be very small. Design and construction of a high performance wing carrying a fold tape have to be specially optimized because of the relative higher complexity compared to a conventional wing. A suited wing design then in total is advantageous due to the lower sizes of the hub, mechanical brake, gearbox, alternator, tower head etc. Also, an expensive wing pitch control and a special wing tip brake are no longer required. In addition, the wind power coefficient will increase at changing wind velocities or at turbulent windsites, because the wing profile must not be designed for a very sudden natural stall to reduce the wing load. Moreover, the wing twist and pitch can be designed for a large distance to the natural stall because of the fast and more precise artificial stall control by the fold tape.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Figure 1:
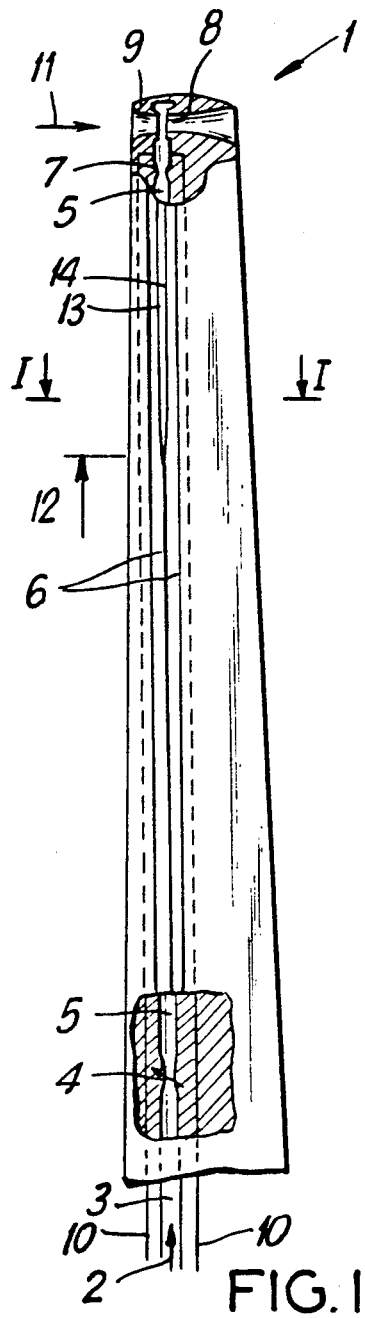
FIG. 1 shows the radial outer part of a wing including the wing tip and showing the suction side.

DETAILED DESCRIPTION OF THE PREFERRED EMBODIMENTS:

In FIG. 1, the radial outer part of a wing 1 equipped with a fold tape 6 may extend over more than 30% of the whole wing length. Inside the wing 1 air is flowing in the direction of arrow 2 via an air inlet 3 and an inlet throttle 4 through a tunnel 5, which is sealed against the environment by the fold tape 6. Leaving the tunnel 5, the airflow streams through an outlet throttle 7 to the smallest cross-section area 8 of a venturi 9 at the wing tip. An electrical heating wire 10 near the tunnel 5 is shown by a dashed line. Arrow 11 shows into the direction of the relative wind velocity. At the moment, the fold tape 6 contour conforms with the wing 1 profile within the range of the radius 12. Above this towards the wing tip, the fold tape 6 is deployed. This can be recognized because both the edges 13,14 produce a trip extending over the partial length 15.

Figure 2:
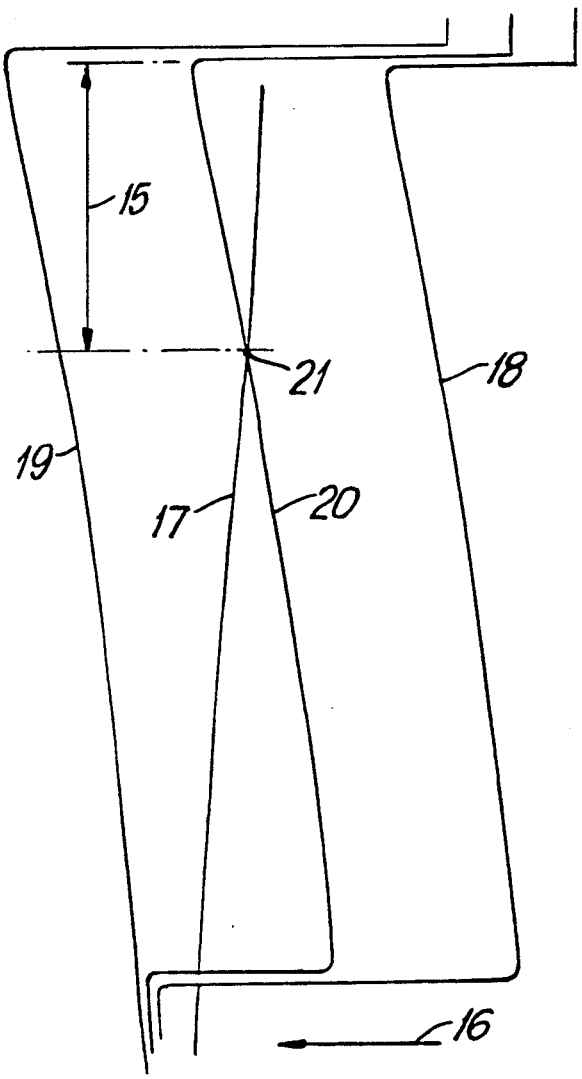
FIG. 2 shows different static pressure curves along the wing of FIG. 1.

FIG. 2 illustrates different pressure curves along the wing 1. The tunnel pressure depends on the opening degree of the inlet throttle 4. In the direction of the arrow 16 the pressure gets higher. The curve 17 shows the average static pressure acting on the suction side of the wing 1 within the range of the fold tape 6. The curve 18 shows the tunnel 5 pressure, when the inlet throttle 4 has more pressure drop than the outlet throttle 7. Because the curve 18 is over its entire range lower than the curve 17, the fold tape 6 completely conforms, different to FIG. 1. By more opening of the inlet throttle 4 the tunnel pressure increases to the curve 19, overcoming curve 17. Now the fold tape deploys over its whole length. The partial length 15 in FIG. 1 will hence be achieved by equalizing the pressure drops of both the throttles. In this case the curve 20 in FIG. 2 intersects the curve 17 at the point 21 producing a fold tape transition zone at radius 12 in FIG. 1. It was found that the intersection point 21 shifts fairly proportional to the opening degree of the inlet throttle 4 with regard to a constant outlet throttle 7 area.

Figure 3:
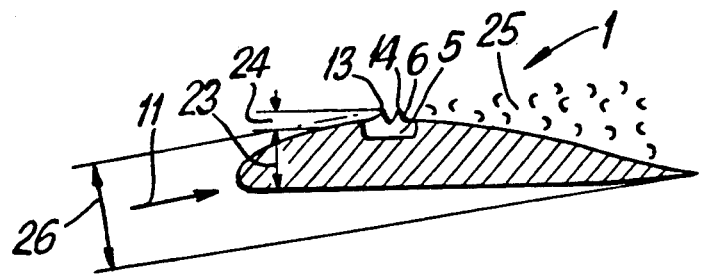
FIG. 3 shows a wing profile section (upscaled) of FIG. 1 along the line I—I.

With a given angle of attack, shown by arrow 11 in FIG. 3, even a modest trip elevation 24 of 10% of the wall thickness 23 produces a remarkable stall zone 25.

Such a trip elevation 24 generates the same drag as a spoiler plate of the height 26. The deployed tape 30 shown in FIG. 4 has one fold 31 at the trailing edge. A stop 32 opposed to the fold 31 limits the elevation of the trip. One or more pillars 33 backup by their shapes a good conforming contour position if the pillars' shape is reset by the respective wall thickness of the fold tape. A pillar 33' can also be extended over a wider section of the tunnel 5 to obtain a larger crosssectional area for the wing structure (see dashed line in FIG. 4). Then, a pillar is part of a spar, whereas the tunnel 5 is mainly inside the spar and has a lot of tunnel branches 5, leading the airflow under the fold tape 30. Those and similar pillar shapes are generally used also on the following variants, as can be seen in FIG. 6 (pillar 133) and in FIG. 8 (pillar 233). The fold tapes 30, 130, 230 are preferably attached and guided by Keyways 34, 35, 134, 135, 234, 235 as shown in FIG. 4 through FIG. 9.

Figure 4:
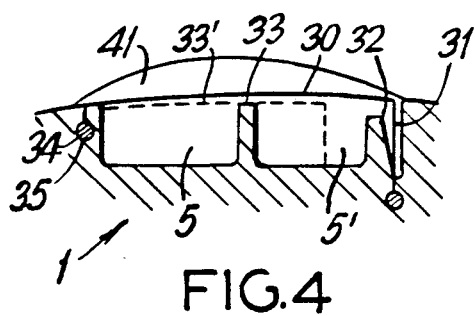
FIG. 4 is a cross-section of a fold tape with one fold in the conform position.
Figure 5:
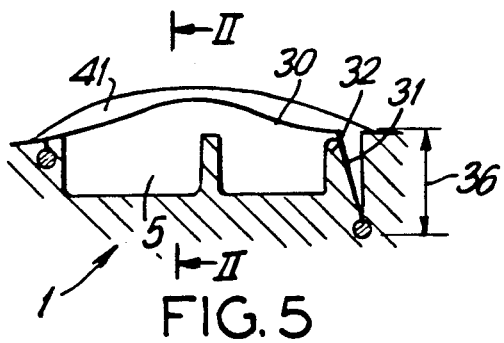
FIG. 5 shows a fold tape of FIG. 4 in the deployed position.
Figure 6:
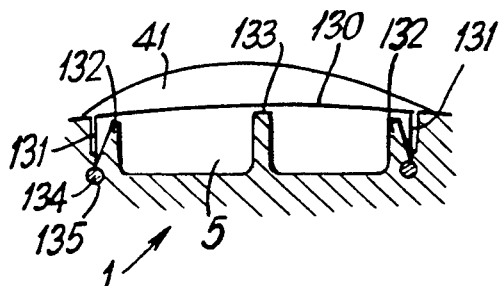
FIG. 6 shows a fold tape with two folds, in the conform position.
Figure 7:
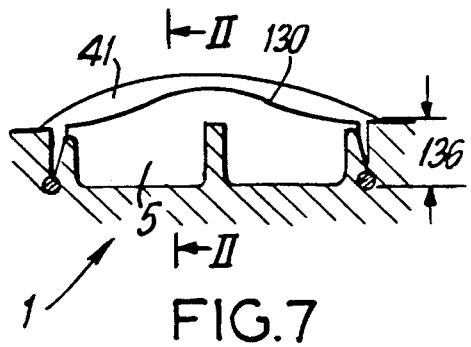
FIG. 7 shows a fold tape of FIG. 6 in the deployed position.

In FIG. 5, the fold tape 30 of FIG. 4 is fully deployed, so that the fold 31 is contacting the stop 32. In FIG. 6 the fold tape 130 is shown, having folds 131 at the leading and trailing edges. A stop 132 opposed to the fold 131 limits the elevation of the trip. The deployed position of the fold tape 130 is shown in FIG. 7, where can be recognized a much lower built-in height 136 than that height 36 in FIG. 5 to provide the same trip elevation.

Figure 8:
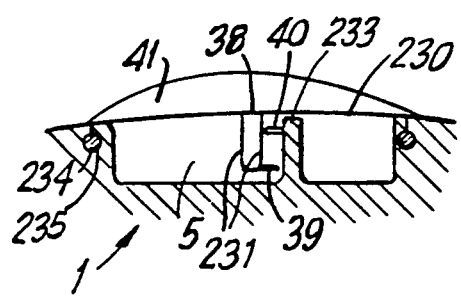
FIG. 8 shows a fold tape with a center line fold and slot.
Figure 9:
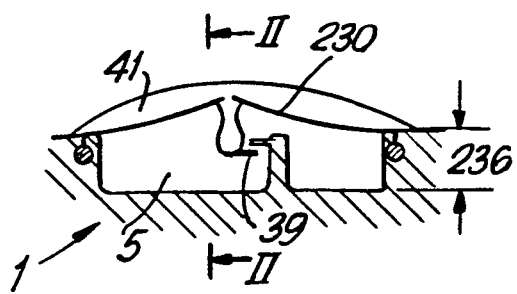
FIG. 9 shows a deployed fold tape of FIG. 8.

FIG. 8 shows a fold tape 230 which is slotted near it centerline. This tape corresponds also to the fold tape 6 in FIG. 3. Sealing the slot 38 is a double fold 231 which extends into the tunnel 5. A ledge 39 is fixed on the summit of the fold 231. On the pillars 233 a stop 40 is fixed, contacting the ledge 39 at the full deployed position, as can be seen in FIG. 9, wherein the slot 38 of FIG. 8 now spreads. Therefore, at the same built-in height 36 as 136 of FIG. 7, the stall will be enlarged.

The arrangements of FIG. 4 to FIG. 9 may also be integrated within an extruded wing.

While the invention has been illustrated and described as embodied in a wind-turbine wing with a pneumatically actuated spoiler, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A wind-turbine wing with an aerodynamic brake, comprising:
    a pneumatically actuated spoiler movable perpendicular to an airstream;
    a tunnel (5), extending radially within the wing (1) on a suction side thereof and seal covered by the spoiler (6) against the environment, a centrifugally acceleratable air column being inside the tunnel (5);
    an inlet throttle (4) arranged near one end of the tunnel (5) so that an inlet airflow enters via the inlet throttle (4); and
    an outlet throttle (7) arranged at another end of the tunnel so that a leaving airflow passes said outlet throttle and leads to an area (9) of low static pressure, and at least one of the throttles having a variable throat area by which tunnel pressure is controlled.

2. A wing according to claim 1, wherein the outlet throttle (7) has a fixed throat area.

3. A wing according to claim 1, wherein the outlet throttle (7) leads the air flow to a smallest flow area (8) of a venturi (9) at the wing tip.

4. A wing according to claim 1, wherein the spoiler (6) is a flexible fold tape (6), (30), (130), (230) movable perpendicular to the outer airstream and furnished with folds (31), (131), (231) extending radially along the wing (1).

5. A wing according to claim 4, wherein at least one of a leading edge and a trailing edge of the fold tape (30), (130) includes folds (31), (131) extending to the keyways and contacting stops (32), so as to limit a deployed position.

6. A wing according to claim 4, wherein the fold tape (230) has at least one fold (231) near its centerline and a ledge (39) at the summit of said at least one fold (231), the ledge contacting a stop (40) inside the tunnel (5) so as to limit a deployed position.

7. A wing according to claim 4, and further comprising end plates (41) fitted on the wing (1) so as to form a narrow air gap (42) opposite to shorter edges of the fold tape (30), (130), (230).

8. A wing according to claim 4, wherein the fold tape has shorter edges which are sealingly fixed.

* * * * *